US00RE37976E

(19) United States
(12) Reissued Patent
Hiramatsu

(10) Patent Number: US RE37,976 E
(45) Date of Reissued Patent: Feb. 4, 2003

(54) WINDING MACHINE STOPPING METHOD

(75) Inventor: Kazuhiko Hiramatsu, Kitakyushu (JP)

(73) Assignee: Kabushiki Kaisha Yaskawa Denki, Fukuoka (JP)

(21) Appl. No.: 09/454,171

(22) PCT Filed: Jun. 21, 1995

(86) PCT No.: PCT/JP95/01238

§ 371 (c)(1),
(2), (4) Date: Feb. 8, 1996

(87) PCT Pub. No.: WO95/35254

PCT Pub. Date: Dec. 28, 1995

Related U.S. Patent Documents

Reissue of:
(64) Patent No.: 5,692,733
Issued: Dec. 2, 1997
Appl. No.: 08/596,261
Filed: Feb. 8, 1996

(30) Foreign Application Priority Data

Jun. 22, 1994 (JP) ..... 6-140531

(51) Int. Cl.[7] ..... B66D 1/54
(52) U.S. Cl. ..... 254/274; 252/362; 252/375
(58) Field of Search ..... 254/274, 362, 254/375

(56) References Cited

U.S. PATENT DOCUMENTS 4,087,078 A * 5/1978 Joraku et al. ..... 254/362
4,276,498 A * 6/1981 Stager et al. ..... 254/362
5,398,911 A * 3/1995 Holster ..... 254/362

FOREIGN PATENT DOCUMENTS

JP 55-52894 * 4/1980
JP 55-93798 * 7/1980
JP 59-124690 * 7/1984
JP 62-239898 * 10/1987

OTHER PUBLICATIONS

D. Ernst, D. Ströle, Industrieelektronik, "Hochwertiger Vierquadrantenantrieb mit Pulsuinrichter," pp. 208–210 (1973) (with translation) (complete date unavailable).
Siemens/Katalog DA 66.2 "Spannungszwischenkreis–Umrichter Simovert P für drehzahlveränderbare Drehstromantriebe" (1991/92) (with translation) (complete date unavailable).

* cited by examiner

*Primary Examiner*—Katherine A. Matecki
(74) *Attorney, Agent, or Firm*—Sughrue Mion, PLLC

(57) ABSTRACT

A method of stopping of a winding machine that hoists and lowers an object prevents abrasion of the electromagnetic brake and the descent of load. The winding machine, which winches a load up or down in response to a torque command TREF to the electric motor M produced by the speed controller ASR in accordance with the a speed command $N_{REF}$ generated by the speed command generation circuit NRC, operates at the stopping of the machine to cease the motor control if the motor speed $N_{FB}$ is zero after the torque command to the motor M is brought to zero for a predetermined length of time following the issuance of a brake command to the electromagnetic brake which is coupled directly to the motor M.

6 Claims, 5 Drawing Sheets

WINDING MACHINE STOPPING METHOD

Matter enclosed in heavy brackets [ ] appears in the original patent but forms no part of this reissue specification; matter printed in italics indicates the additions made by reissue.

BACKGROUND OF THE INVENTION

The present invention relates to a method of stopping a winding machine which is used for winching a crane rope up and down.

Winding machines, which use electric motors for driving and electromagnetic brakes for stopping, manage the critical timing of the operation of the motor and electromagnetic brake during the transition from working to stopping. Far example, when an operator wishes to winch down a load with a crane rope and stop the crane when the load reaches a certain height, if the activation of the electromagnetic brake comes after the motor stops, the crane rope will temporarily be in a no-torque state, resulting in the dangerous descent of the load.

To deal with this matter, Unexamined Japanese Patent publication No. Sho 59-124690 discloses a method of controlling the timing of the operation of the motor and electromagnetic brake in which the electromagnetic brake is activated immediately before the motor stops, thereby halting the descent of load. FIG. 1 is a block diagram of the control circuit of this prior art, and FIG. 2 is the timing chart at stopping.

In the figure, a winch induction motor $M_1$ has its output shaft coupled at one end to a drum of an electromagnetic brake MB and at another end to a winch drum D through a reduction gear G. Connected between a primary winding of the induction motor $M_1$ and the power source is a variable-voltage, variable-frequency inverter I1. which is also connected to the electromagnetic brake MB by way of a brake controller BC.

The operation of the system will be explained with reference to FIG. 2. When a stop command SR is issued to the inverter h at time $t_7$, the speed command $N_{REF}$ to the induction motor MI decreases, and the motor speed $N_{FB}$ falls accordingly. When the motor speed $N_{FB}$ has fallen to a prescribed level (immediately before the stop), a brake command BR is issued to the electromagnetic brake MB at time $t_8$ to activate it.

In the above prior art method of stopping a winding machine, the electromagnetic brake is activated during the rotation of the motor, and therefore has the problem of prematurely wearing the electromagnetic brake. Another problem is that the control ceases at time is when the speed command $N_{REF}$ reaches zero, causing the current command to become zero, even if the electromagnetic brake is not activated, in which case the descent of the load will occur.

SUMMARY OF THE INVENTION

Accordingly, an object of the present invention is to prevent abrasion of the electromagnetic brake and the descent of the load.

In order to achieve the above objective, the inventive method of stopping a winding machine which operates to winch a load up or down in response to a torque command applied to an electric motor and produced by a speed controller in accordance with a speed command generated by a speed command generation circuit, the method comprising the steps of: decreasing the speed command to the motor to zero for a predetermined length of time at the stopping of the motor, thereby the torque command to the motor is controlled to zero; braking the motor by issuing a brake command to an electromagnetic brake which is coupled directly to the motor after the motor speed $N_{FB}$ detected by the speed detector is zero and turning off a power supply to the motor if the motor speed $N_{FB}$ detected by the speed detector is zero.

In the inventive method of stopping a winding machine, if the motor does not rotate when the torque command is reduced to zero for a predetermined length of time following the activation of the electromagnetic brake after the motor has stopped completely based on the operation of the above-mentioned means, it can be judged that the electromagnetic brake is producing a torque sufficient to withstand the load at that time, and therefore the descent of load can be prevented even in the absence of the motor control. By activating the electromagnetic brake during the stoppage of the motor, the brake will incur abrasion and the descent of load is prevented.

DETAILED DESCRIPTION OF THE INVENTION

An embodiment of this invention will be explained with reference to the drawings.

Figure 1:
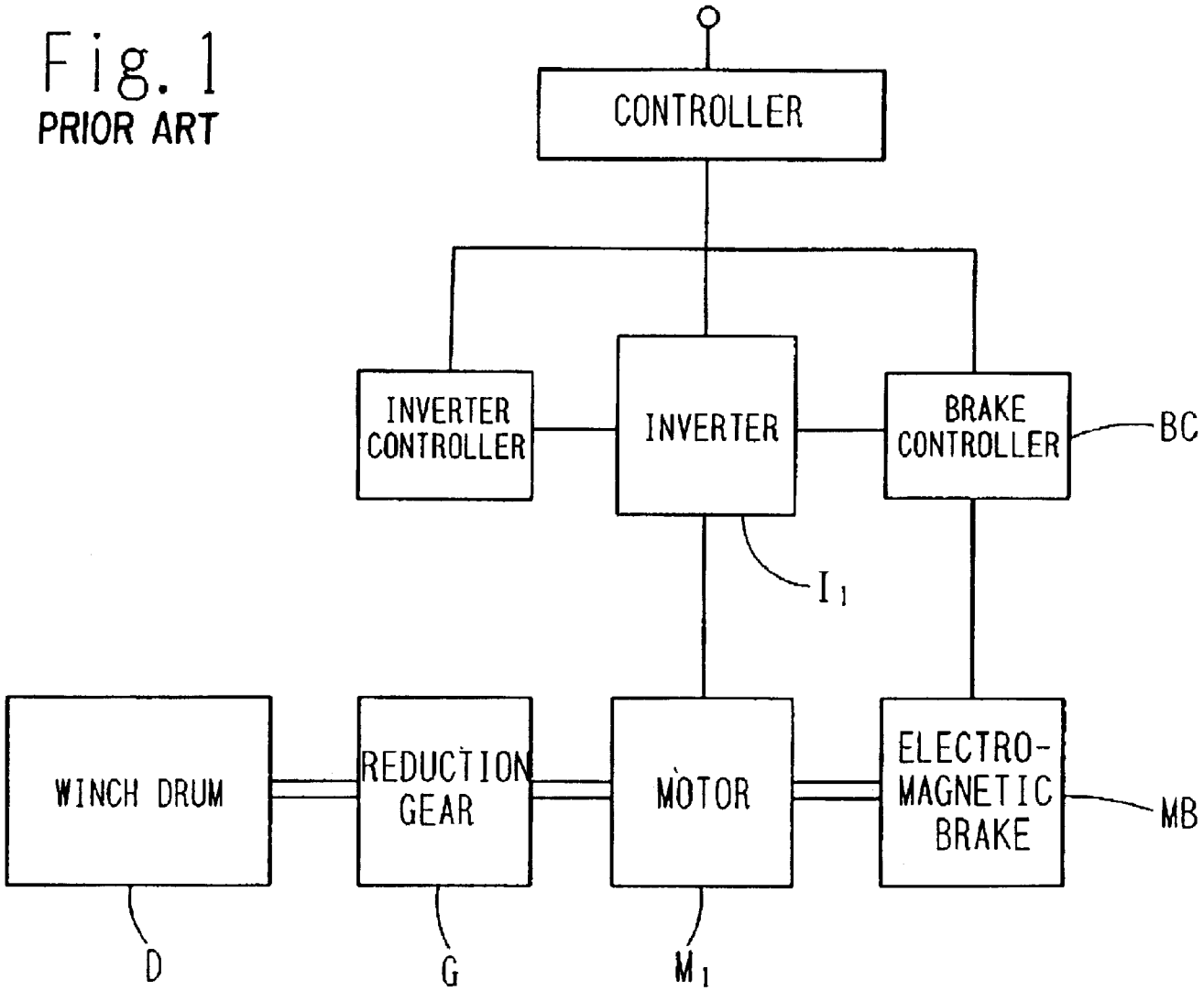
Fig. 1 PRIOR ART
FIG. 1 is a schematic diagram showing the arrangement of a conventional winding machine.
Figure 2:
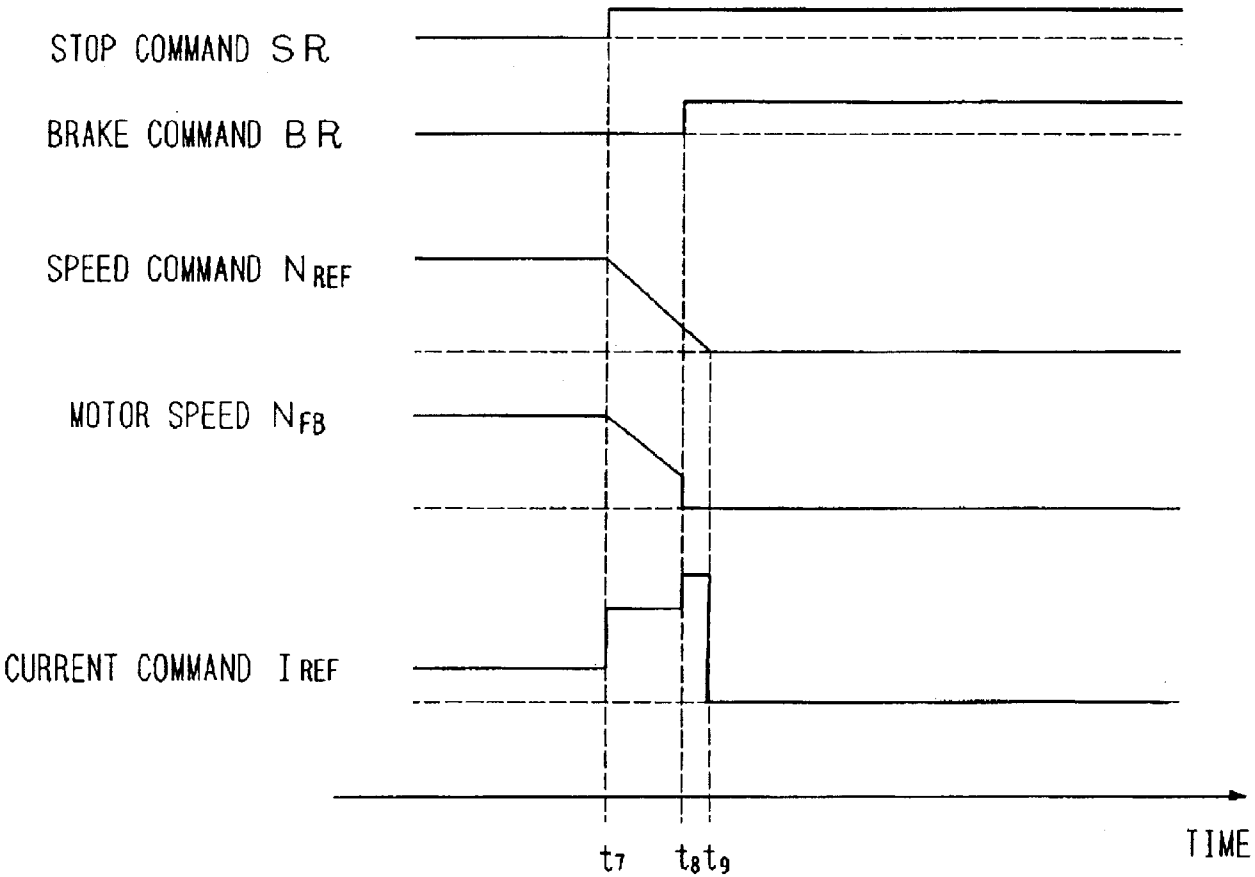
Fig. 2 PRIOR ART
FIG. 2 is a timing chart used to explain the operation at the stopping of the winding machine.
Figure 3:
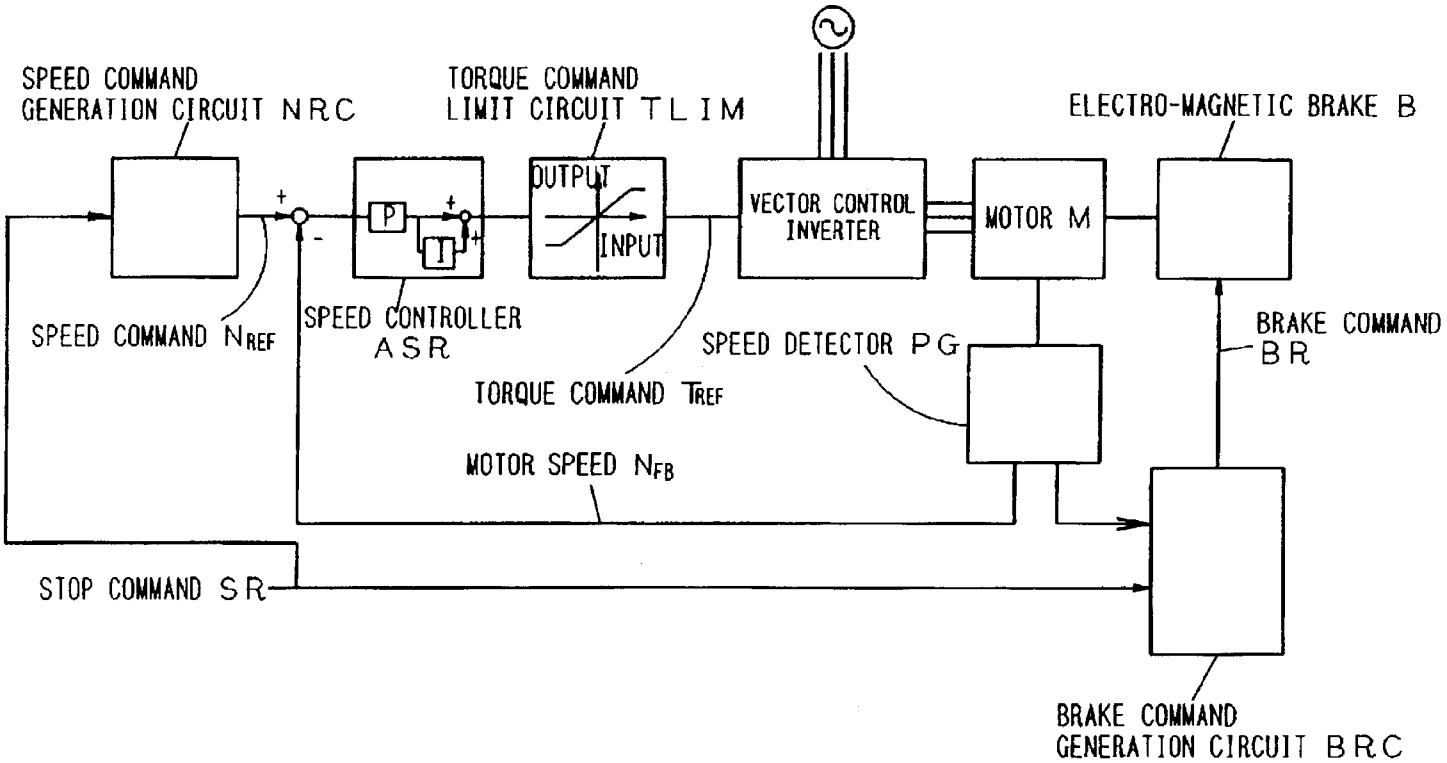
FIG. 3 is a block diagram showing the principal arrangement of an embodiment of this invention of a method of stopping of a winding machine.

In FIG. 3, reference symbol M denotes an induction motor. A difference in the speed $N_{FB}$ Of the induction motor M detected by a speed detector PG, such as a pulse tachogenerator, from a speed command $N_{REF}$ produced by a speed command generation circuit NRC is fed to a speed controller ASR. A torque command limit circuit TLIM, which limits a torque command value, produces a torque command TREF which is fed to a vector-control inverter INV, for driving the induction motor M. A stop command SR and the motor speed $N_{FB}$ detected by the speed detector PG, are fed to a brake command generation circuit BRC which issues a brake command BR to an electromagnetic brake B.

Figure 4:
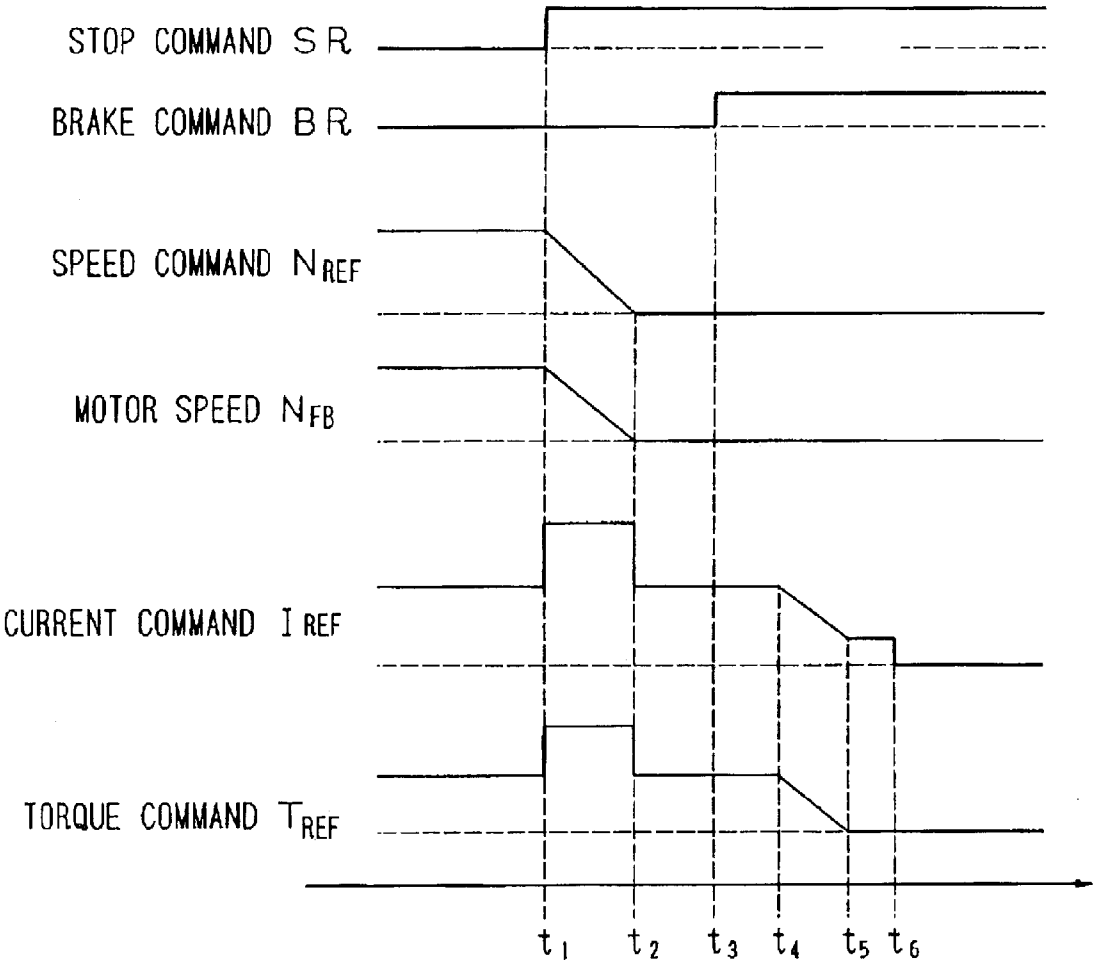
FIG. 4 is a timing chart used to explain the operation of this embodiment.

The operation of the circuit shown in FIG. 3 will be explained in connection with the timing chart of FIG. 4.

During the operation of the induction motor M, when a stop command SR shown in FIG. 3 is issued to the speed command generation circuit NRC at time $t_1$ (step 100 in FIG. 5), the speed command generation circuit NRC produces a decreasing speed command $N_{REF}$, and the motor speed $N_{FB}$ falls accordingly. After the motor speed $N_{FB}$ has reached zero at time $t_2$, the brake command generation circuit BRC issues a brake command BR to the electromagnetic brake B at time $t_3$, and it operates accordingly. Since the electromagnetic brake B operates in the state of zero motor speed $N_{FB}$ , it does not suffer any abrasion. A time period from $t_3$ to $t_4$ allows for the delay in operation of the electromagnetic brake B. Torque command limit circuit TLIM reduces the torque command TREF to zero within a time period from t, to $t_5$. After time $t_4$, if the motor speed $N_{FB}$ remains at zero at a zero torque command, indicative of the generation by the electromagnetic brake B of a braking torque which withstands the load, the descent of the load will not occur even though the the power supply to the induction motor has been turned off. Accordingly, the the power supply to the induction motor can be stopped at time $t_5$.

Figure 5:
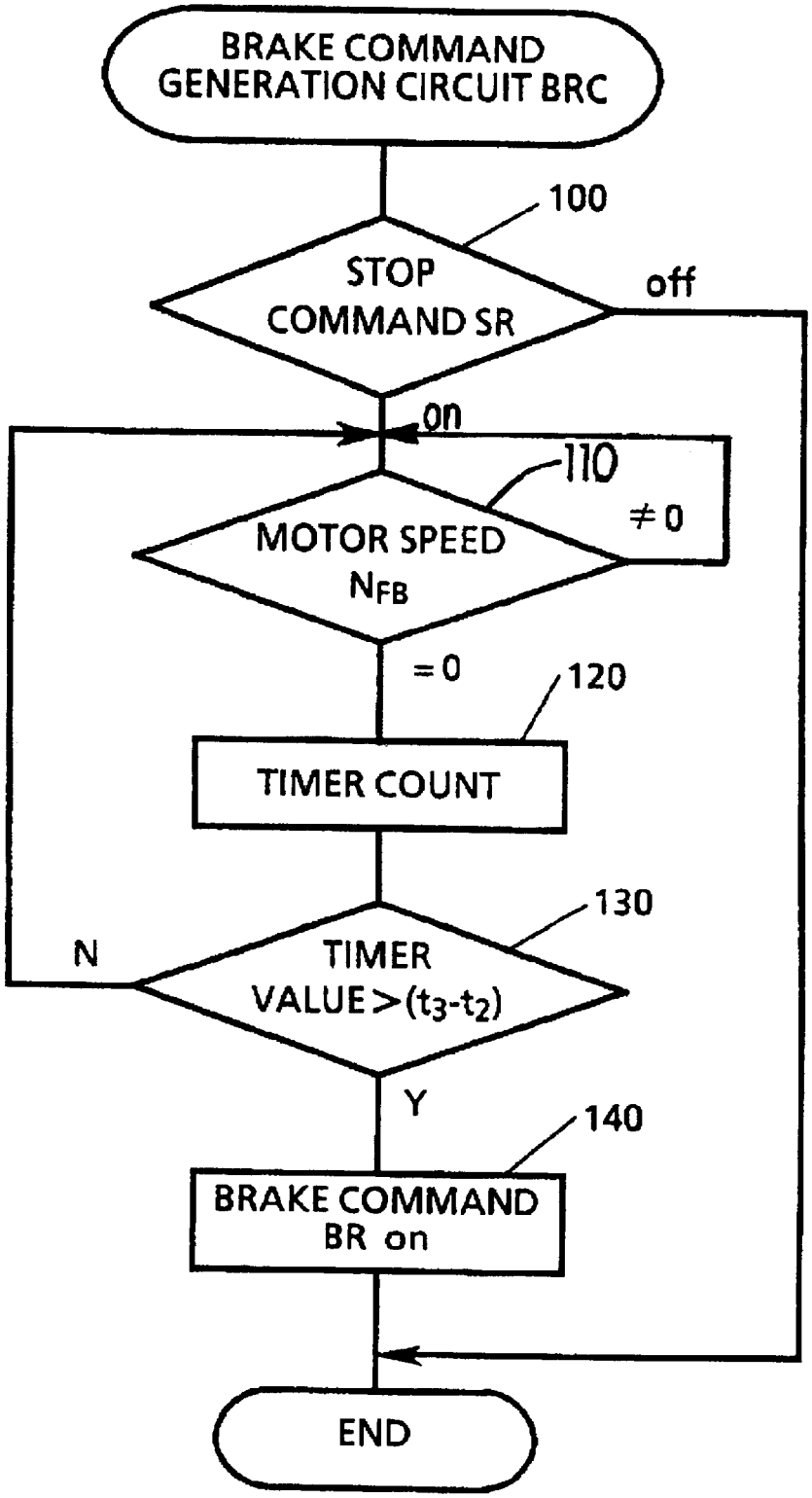
FIG. 5 is a flowchart of the control sequence for the brake command generation circuit based on this invention.

FIG. 5 shows the control sequence of braking implemented by the brake command generation circuit BRC. In the figure, when the circuit BRC receives a stop command SR (step 100), it monitors the motor speed $N_{FB}$ (step 110), and it operates a timer to measure the time after the motor speed $N_{FB}$ has reached zero (step 120). When the timer value is greater than the value of $t_3$–$t_2$ (step 130), the brake command generation circuit BRC issues a brake command BR to the electromagnetic brake B to thereby activate it (step 140).

The present invention can be applied to the field of winding machines used for overhead traveling cranes in various plants and storage yards.

I claim:

1. A method of stopping of a winding machine which operates to winch a load up or down in response to a torque command for controlling an electric motor where said torque command is produced by a speed controller in accordance with a speed command generated by a speed command generation circuit, said method comprising the steps of:

decreasing the speed command for said electric motor to zero for a predetermined length of time when stopping the electric motor;

detecting a motor speed $N_{FB}$ of said electric motor using a speed detector;

braking said motor by issuing a brake command to an electromagnetic brake coupled to said electric motor after said motor speed $N_{FB}$ of said electric motor has reached zero and a second predetermined length of time following said motor speed reaching zero has expired;

reducing said torque command to zero following engagement period of said electromagnetic brake;

detecting the electric motor speed after said torque command is zero; and turning off a power supply for the electric motor if the electric motor speed $N_{FB}$ detected by the speed detector is zero following said torque command reaching zero.

2. A method of stopping of a winding machine according to claim 1, wherein in said braking step, a timer is operated to measure said second predetermined time period after the motor speed has reached zero, and said brake command is issued by a brake command generation circuit to said electromagnetic brake when a counter value of said timer is greater than a prescribed value to activate said electromagnetic brake.

3. A method of stopping a winding machine wherein the finding machine includes an electric motor coupled to an ectromagnetic brake, a speed command generation circuit for generating a speed command, a speed detector for detecting a speed of said electric motor and outputting a tested speed, a speed controller circuit for receiving a difference between the speed command and the detected speed of the electric motor and generating a torque command means for driving the electric motor in accordance with said torque command, and a brake command circuit for driving said electromagnetic brake in accordance with a stop command and said detected speed, the method comprising the steps of:

issuing said stop command to the brake command circuit and the speed command generation circuit;

said speed command generation circuit outputting a speed reduction to zero command to the speed controller circuit in response to receiving the stop command to reduce a speed of said electric motor to zero;

said brake command circuit, in response to receiving said stop command and receiving a detected speed from the speed detecting circuit and determining that said detected speed is zero, executing a first predetermined delay period and issuing a brake command to said electromagnetic brake at a completion of said predetermined delay period to apply a braking force to the electric motor;

said means for driving the electric motor reducing a torque of said electric motor to zero following a second predetermined delay period after issuance of said brake command which allows for activation of said electromagnetic brake; and said means for driving the electric motor releasing control of said electric motor by ceasing a current applied thereto after completion of reducing said torque of said motor to zero and expiration of a third predetermined time period when said detected motor speed remains at zero indicating that said electromagnetic brake is functionally engaged.

*4. A method of controlling an electric motor, comprising:*

*decreasing a speed command for the electric motor to zero for a predetermined length of time when stopping the electric motor;*

*detecting a motor speed of said electric motor using a speed detector:*

*braking said motor by issuing a brake command to an electromagnetic brake coupled to said electric motor after said motor speed of said electric motor has reached zero and a second predetermined length of time following said motor speed reaching zero bas expired;*

*reducing said torque command, which controls said electric motor, to zero following engagement period of said electromagnetic brake;*

*detecting the electric motor speed after said torque command is zero: and*

*turning off a power supply for the electric motor if the electric motor speed detected by the speed detector is zero following said torque command reaching zero.*

*5. The method according to claim 4, wherein in said braking operation, a timer is operated to measure said second predetermined time period after the motor speed has reached zero, and said brake command is issued by a brake command generation circuit to said electromagnetic brake*

*when a counter value of said timer is greater than a prescribed value to activate said electromagnetic brake.*

*6. A method of controlling an electric motor, comprising:* issuing a stop command to a brake command circuit and a speed command generation circuit,

*wherein said speed command generation circuit outputs a speed reduction to zero command to a speed controller circuit in response to receiving the stop command to reduce a speed of said electric motor to zero;*

*wherein said brake command circuit, in response to receiving said stop command and a detected speed of said electric motor from a speed detecting circuit and determining that said detected speed is zero, executes a first predetermined delay period and issues a brake command to an electromagnetic brake at a completion of said predetermined delay period to apply a braking force to the electric motor;*

*reducing a torque of said electric motor to zero following a second predetermined delay period after issuance of said brake command which allows for activation of said electromagnetic brake: and*

*releasing control of said electric motor by ceasing a current applied thereto after completion of reducing said torque of said motor to zero and expiration of a third predetermined time period when said detected motor speed remains at zero indicating that said electromagnetic brake is functionally engaged.*

* * * * *